United States Patent [19]

Ishihara et al.

[11] Patent Number: 4,519,762
[45] Date of Patent: May 28, 1985

[54] MULTI-MOLD MOLDING APPARATUS FOR PRODUCING A MOLDED SKIN PRODUCT

[75] Inventors: Tuneo Ishihara, Kawagoe; Masayosi Uchida, Iruma, both of Japan

[73] Assignee: Honda Giken Kogyo Kabushiki Kaisha, Tokyo, Japan

[21] Appl. No.: 521,539

[22] Filed: Aug. 9, 1983

[30] Foreign Application Priority Data

Feb. 21, 1983 [JP] Japan ................. 58-26203

[51] Int. Cl.³ .............................. B29F 5/00
[52] U.S. Cl. ..................... 425/183; 425/449
[58] Field of Search ................. 425/183, 449

[56] References Cited

U.S. PATENT DOCUMENTS 3,880,968  4/1975  Kaspar et al. ............. 264/37
3,947,165  3/1976  Szatkowski ................ 264/309
4,243,362  1/1981  Rees et al. ............... 425/183

FOREIGN PATENT DOCUMENTS 57-112996  7/1982  Japan ................... 425/183

Primary Examiner—James Derrington
Attorney, Agent, or Firm—Armstrong, Nikaido, Marmelstein & Kubovcik

[57] ABSTRACT

An apparatus including a treating container having at its inner lower portion a space for containing a charge of synthetic resin powder. An agitator is provided therein having an agitation blade means for spattering upwards the charged layer of synthetic resin powder. A metallic mold is provided thereabove closing an upper surface of the treating container. The metallic mold is provided with a downwardly directed molding mold surface for facing the charged powder layer. The mold surface thereof is arranged to be selectively heated or cooled at will. This invention is characterized in that a rotary frame is provided on one side of the treating container, at least two of the metallic molds are so disposed on the rotary frame as to be at rotationally symmetrical positions, and the treating container is so arranged as to be retreated outside the rotation loci of these metallic molds.

1 Claim, 2 Drawing Figures

MULTI-MOLD MOLDING APPARATUS FOR PRODUCING A MOLDED SKIN PRODUCT

This invention relates to an apparatus for manufacturing of a molded skin material used for an interior decoration member for a vehicle such as a motorcar or the like.

An apparatus has been previously proposed in Japanese patent application No. 78195/Sho 57 (1982), U.S. patent application Ser. No. 494,103 filed May 12, 1983, having a treating container with an inner lower portion defining a space for receiving a charge of synthetic resin powder. An agitator is provided in the space having an agitation blade means for spattering the charge of synthetic resin powder upwardly. A metallic mold is provided above the container closing the upper surface of the treating container. The metallic mold is provided with a downwardly directed molding mold surface facing the charge of powder. The mold surface thereof includes means for selectively heating and cooling. This apparatus is used for producing a molded skin material by violently agitating the synthetic powder so that it is adhered and deposited on the heated mold surface and is fused to be formed into a desired thickness of the fused resin layer. The heating is maintained for a predetermined time to form a melted formed coat. The melted formed coat is then cooled and solidified. These steps are referred to as the coating forming step and the cooling solidifying step. The apparatus is inconvenient in that a forming cycle time is long. Accordingly, in order to attain the formed skin materials in large quantities, it is necessary to install a large number of this apparatus. A comparatively large space is required. In this respect, shortening of the forming cycle time is desired.

OBJECT AND SUMMARY OF THE INVENTION

An object of this invention is to provide an apparatus for manufacturing of a molded skin material by which the forming cycle time required for the foregoing proposed apparatus can be shortened to meet the foregoing desire.

This object is obtained in an apparatus including a treating container having at its inner lower portion a space for containing a charge of synthetic resin powder. An agitator is provided therein having an agitation blade means for spattering upwards the charged layer of synthetic resin powder. A metallic mold is provided thereabove closing an upper surface of the treating container. The metallic mold is provided with a downwardly directed molding mold surface for facing the charged powder layer. The mold surface thereof is arranged to be selectively heated or cooled at will. This invention is characterized in that a rotary frame is provided on one side of the treating container, at least two of the metallic molds are so disposed on the rotary frame as to be at rotationally symmetrical positions, and the treating container is so arranged as to be retreated outside the rotation loci of these metallic molds.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

One example of this invention will now be explained in detail with references to the accompanying drawing.

Figure 1:
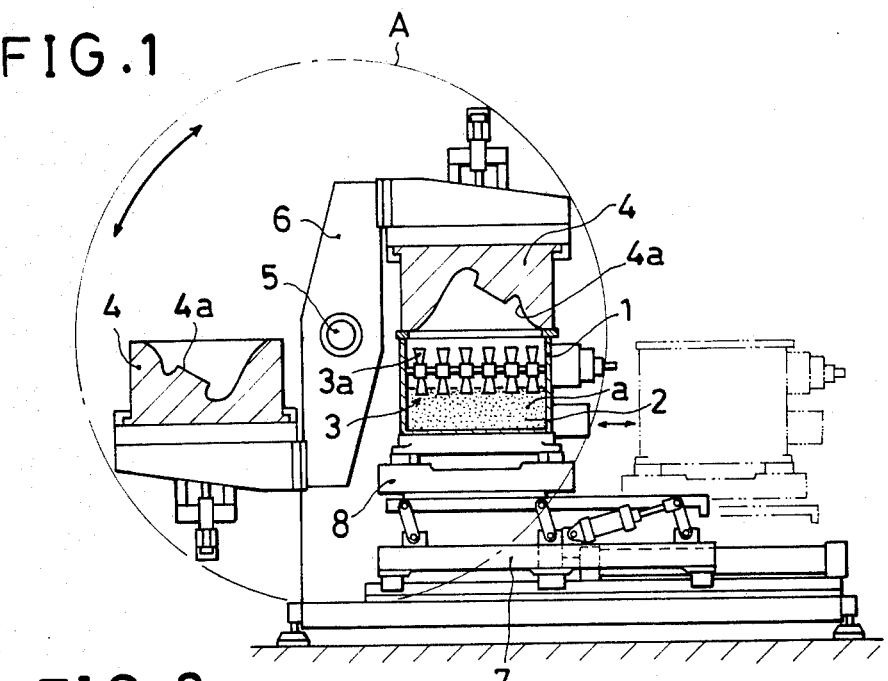
FIG. 1 is a side view, partly omitted, of one embodiment of this invention.

Referring to FIG. 1, a treating container 1 has a predetermined depth and is open at its top surface. A lower space of the interior of the container 1 is charged with a charged lawyer 2 of synthetic resin powder a comprising a large number of fine particles. A rotary agitator 3 is provided horizontally over the charged layer 2 having an agitation blade means which comprises a number of agitation groups each comprising radially extending agitation blades 3a. Those agitation groups are disposed on the rotary shaft of the agitator 3 at predetermined equal intervals along the axial direction thereof, so that the synthetic resin powder a may be spattered upwards by rotating the agitation blades 3a. A metallic mold 4 for closing the top surface of the container 1 is in abutment with the peripheral upper end of the container 1. The metallic mold has a downwardly directional molding surface 4a facing the charged layer 2. In addition, there is provided a temperature adjusting jacket on the rear surface of the molding surface 4a, though not illustrated, so that a whole area of the molding surface 4a may be heated or cooled alternately by selectively flowing a heating medium or a cooling medium thereinto.

The above arrangement is the same construction as the previously proposed manufacturing apparatus. According to this invention, there is additionally provided a rotary frame 6 which is rotatable about a horizontal shaft 5 provided on one side of the container 1. The rotary frame 6 is provided with at least one pair of the metallic molds 4 which are disposed at rotationally symmetrical positions one with another. The container 1 is arranged to be retreatable outside the rotation loci A of the molds 4 by a means for advancing and retreating. In the illustrated example, the rotary frame 6 is pivotally supported on the left side of the container 1 through the shaft 5 on a supporting upright pillar (not shown) so that the same is rotatable about the shaft 5. Two metallic molds 4 are attached thereto at 180 degree rotational symmetrical positions so that either one of the two molds may be rotated to be positioned alternately at either one of a set position where the same is brought into abutment with the top surface of the container 1 and a standby position where the same is positioned on the side of the container. A means is connected to shaft 5 for rotating the frame 6. Furthermore, the container 1 is mounted through a lifter 8 on a movable base 7 which is movable forwards and backwards in a horizontal direction, so that the container 1 is movable upwards and downwards by the lifter 8 and also is retreatable outside the rotary loci A of the rotation molds 4 by the movable base 7.

In the illustrated example, one pair of the metallic molds 4 have been attached to the rotary frame 6, but it is of course possible that three or more thereof may be attached thereto.

Next, the operation of the apparatus of this invention will be explained. Initially, the container 1 is moved from its retreated position forwards to be positioned below one of the molds 4 which is positioned at the set position. By raising the lifter 8, the container is then brought into sealing contact with the metallic mold 4. Thereafter, the molding surface 4a of the mold 4 is heated by the heating medium. When the surface 4a reaches a predetermined temperature, the synthetic resin powder a is spattered by the agitation blades 3a of the agitator 3 so as to adhere to the molding surface 4a and be melted, so that a melted synthetic resin layer of a predetermined thickness is formed thereon. Thereafter the rotation of the agitator 3 is stopped and the heated condition is maintained for a predetermined time so that the melted resin layer may be matured and fused. Thus, a predetermined melted resin coat of a smooth surface is formed thereon. After this coat forming step, the lifter 8 is lowered and the movable base 7 is moved so that the container 1 is brought into its retreated position which is outside the rotation loci of the molds 4. Thereafter the rotary frame 6 is rotated in the clockwise direction. The foregoing mold 4 at the set position is replaced by another mold 4 which has been positioned at the standby position. The molding mold surface 4a having the foregoing melted formed coat is cooled by the cooling medium so as to be solidified. Thus, there is produced a formed skin material thereon, and the same is taken out from the mold 4. During the time when such a cooling and solidifying step is being carried out, the movable base 7 is moved forwards again; the container 1 and the other mold 4 which is now at the set position are brought into close and sealing contact with each other; and in such a similar manner as above there is formed a predetermined melted and formed coat on the molding surface 4a of the other mold 4.

After completion of the melted coat forming step, the container 1 is lowered and moved backwards outside the rotation loci A of the rotary molds 4. Thereafter the rotary frame 6 is rotated in the counterclockwise direction, so that the other mold 4 at the set position is replaced by the mold 4 which was positioned at the standby position. The melted coat formed on the molding surface 4a of the other mold 4 is cooled and solidified. Consequently, there is produced a predetermined molded skin material thereon. Thus, a large number of formed skin materials can be manufactured continuously by repeating the above operations of the two molds.

Figure 2:
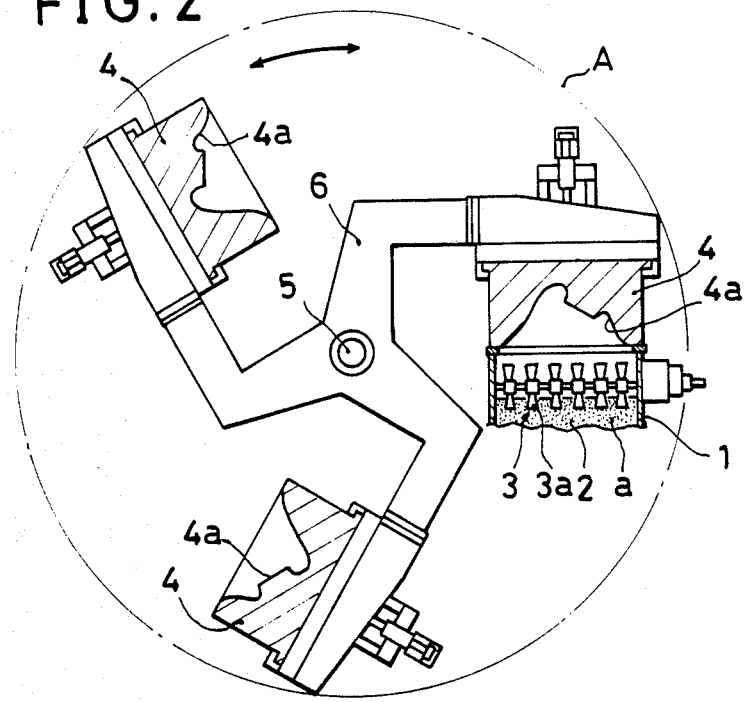
FIG. 2 is a side view of a part of a modified example thereof.

FIG. 2 shows a modified example of this invention. In this case, three molds 4 are attached at rotatably symmetrical positions to the rotary frame 6 having three arms which extend radially at regular intervals therebetween, so that the three are disposed at equal distance therebetween along on the rotation loci A of the rotary frame 6.

Thus, according to this invention, there is provided on the side of a treating container a rotary frame which is rotatable about a horizontal shaft, and at least two metallic molds are so provided on the rotary frame at rotationally symmetrical positions. The container is arranged to be retreatable outside the rotation loci of the molds, so that a coat forming process by one of the molds and a coat cooling and solidifying process by the other mold can be carried out in parallel. Also, a coat forming process by the other mold and a coat cooling and solidifying process can be carried out in parallel. The coat forming process and the cooling and solidifying process can be carried out at the same time and continuously. As a result the molding cycle time for producing the molded skin material can be shortened, a large quantity of formed skin materials can be carried out at high efficiency.

It is readily apparent that the above-described multimold molding apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for manufacturing of a molded skin material including a treating container having at its inner lower portion a space for containing a charged layer of synthetic resin powder, an agitator provided in the space having an agitation blade means for spattering upwards the charged layer of synthetic resin powder, and a metallic mold above the space closing an upper surface of the treating container, the metallic mold being provided with a downwardly directed molding mold surface facing the charged powder layer, the mold surface thereof having means for selectively heating and cooling said mold surface, characterized in that a rotary frame is provided on one side of the heating container, and at least two said metallic molds are disposed on the rotary frame to be at rotationally symmetrical positions, means are provided for rotating the frame and the treating container is so arranged as to be retreated outside a rotation loci of these metallic molds by means for advancing and retreating.

* * * * *